Mar. 3, 1925.  
1,528,652  
H. E. BRIAIS [NOW BY JUDICIAL CHANGE OF NAME H. E. BRICE]  
LOCKING MEANS  
Filed March 5, 1923 2 Sheets-Sheet 1
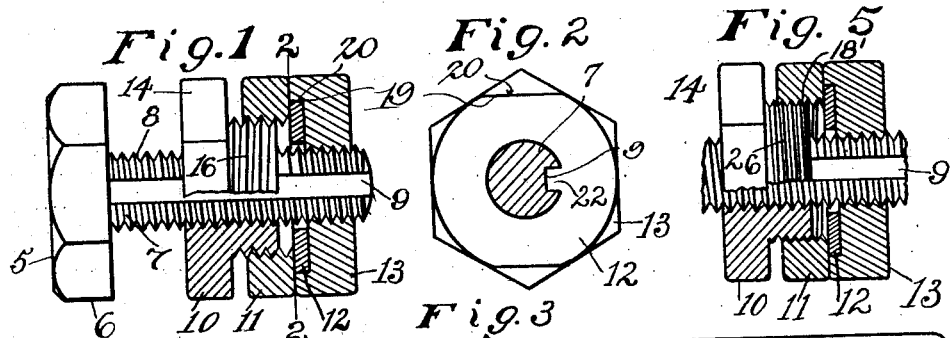
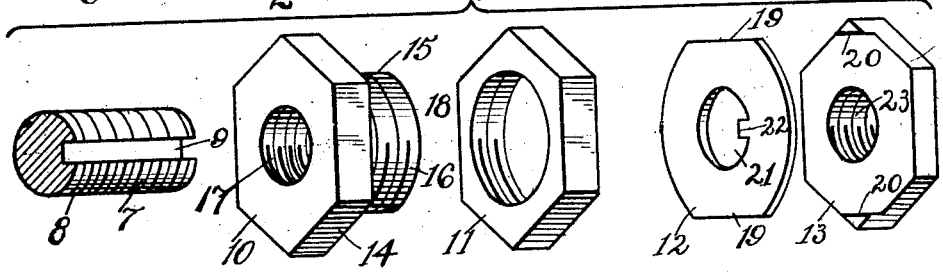
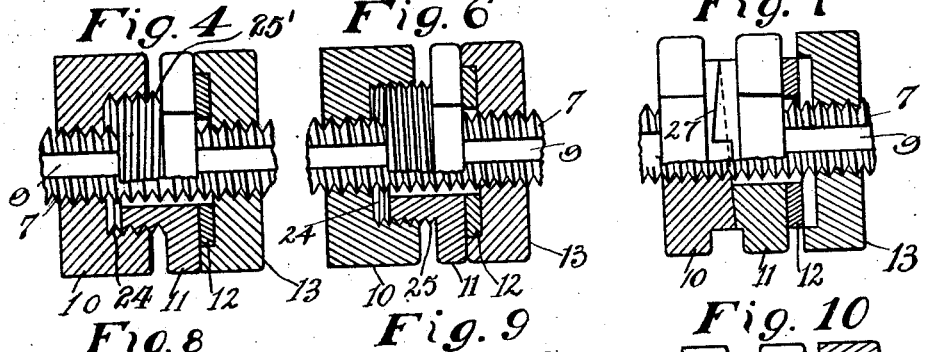
Henry E. Briais  
Now by judicial change of name, Henry E. Brice  
INVENTOR
BY Victor J. Evans  
ATTORNEY
WITNESS: Wm. C. Michael.

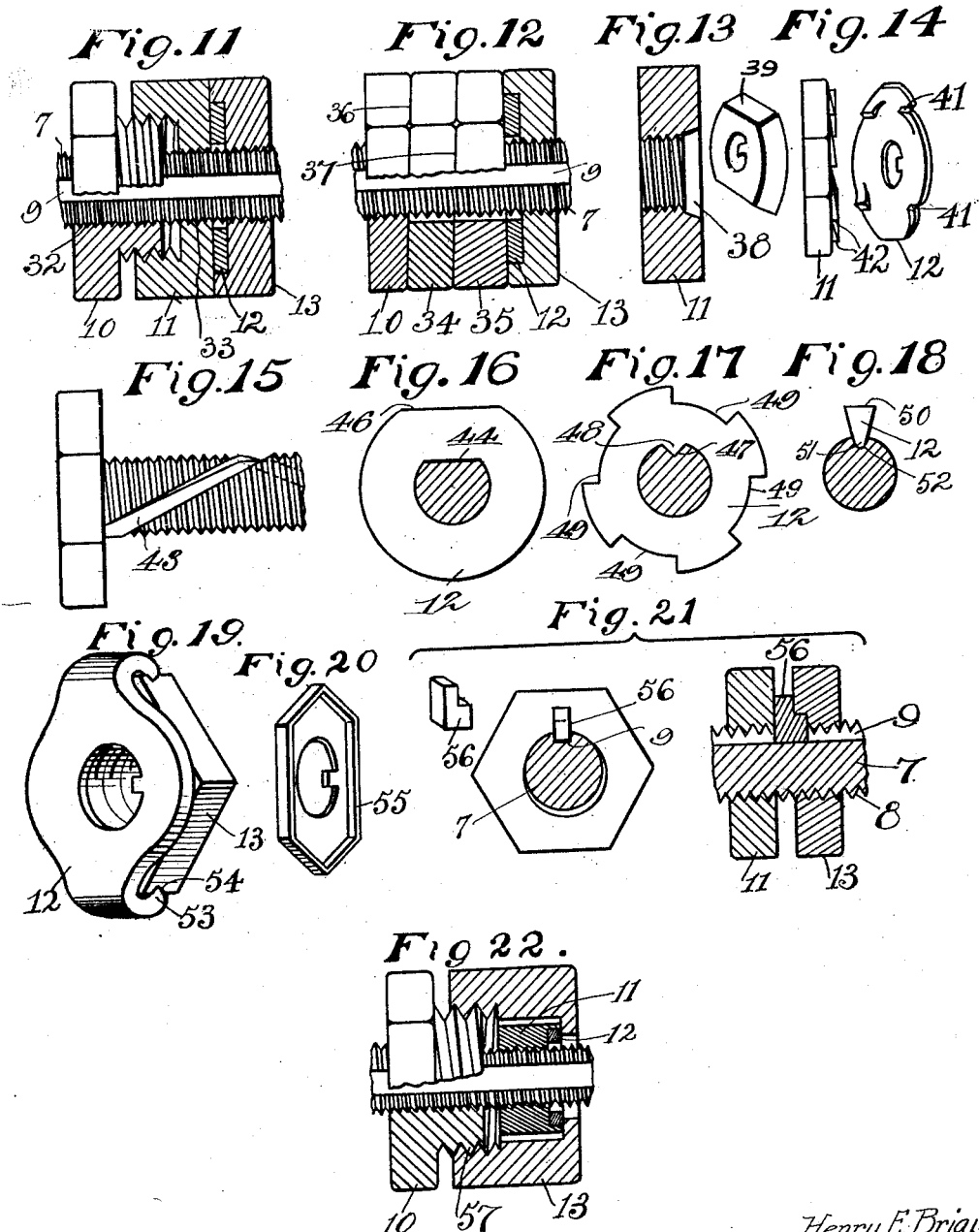

Patented Mar. 3, 1925.

1,528,652

UNITED STATES PATENT OFFICE.

HENRY E. BRIAIS, NOW BY JUDICIAL CHANGE OF NAME HENRY E. BRICE, OF NEW YORK, N. Y.

LOCKING MEANS.

Application filed March 5, 1923. Serial No. 622,983.

*To all whom it may concern:*

Be it known that I, HENRY E. BRIAIS (now by judicial change of name HENRY E. BRICE), a citizen of the United States, residing at New York city, in the county of New York and State of New York, have invented new and useful Improvements in Locking Means, of which the following is a specification.

This invention relates to locking means for locking a nut on a bolt and more particularly to what is known as lock nuts.

The principal object of the invention is the provision of a lock nut, wherein a nut is securely locked upon a bolt in such manner that the tendency of a nut to work loose from the bolt, will only tend to lock the same thereon.

Another object of the invention is the provision of a means for locking a nut upon a bolt, the same consisting of relatively few parts, which parts are easily and quickly assembled.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a view partly in elevation and partly in section of my improved lock nut.

Figure 2 is a tranverse sectional view therethrough taken on the line 2—2 of Figure 1.

Figure 3 is a collective view in perspective of the several parts constituting my invention.

Figures 4 to 22 are modified forms of the various ways in which my invention could be carried out.

Referring more particularly to the drawing, the reference numeral 5 designates a bolt of the usual well-known construction including a head 6, a shank 7 connected with the head, and the shank 7 being provided with screw threads 8 and having a longitudinal groove or recess 9 extending the entire length of the same. My invention consists primarily of four parts which I shall refer to in all the views as parts 10, 11, 12 and 13.

In the preferred form of my invention as shown in Figures 1 to 3 inclusive, the part 10 is provided with a wrench surface 14 and a reduced boss or extension 15, the extension having external threads 16 of a pitch contrary or opposite to the threads 8 of the bolt. The part 10 has a threaded bore 17, the threads of which co-act with the threads 8 of the bolt. The part 11 is in the form of a nut having a screw threaded bore 18 for threaded engagement with the boss 15 of the part 10 for a purpose to be presently described. The part 12 is in the nature of a circular washer and abuts the member 11 when in locking engagement. The part 12 is cut-away at diametrically opposite points to form flat surfaces 19 adapted to be received beneath the shoulders 20 of the part 13. The part 12 is provided with a bore 21 of a size slightly larger than the threads 8 of the bolt to permit the same to be inserted thereon, and projecting within the bore 21 is a finger 22. The finger 22 is slidable in the groove 9 of the bolt and together with the shoulders 20 of the part 13 and the flat surfaces 19, serve to prevent the parts 12 and 13 from turning about the bolt. The part 13 has a threaded bore 23, the threads of which co-act with those of the bolt when the same is threaded thereon.

When assembling the several parts to their locking position, the part 11 is first screwed upon the boss 15 of the part 10 until the same abuts the head of the part 10 after which the part 10 is screwed to the desired distance upon the shank 7 of the bolt. The part 12 is now slid along the bolt with the finger 22 in the recess or groove 9 until it is brought up against the parts 10 and 11. The part 13 is now screwed upon the bolt to a position adjacent the part 12 and as close thereto as will permit of the shoulders 20 to align with the flat surfaces 19 of the part 12. The part 11 is now unscrewed in a direction toward the part 13 thereby forcing the part 12 into contact with the part 13, the surfaces 19 of the part 12 underlying the shoulders 20. The part 13 is now locked upon the bolt and is prevented from rotating by reason of the shoulders 20 co-acting with the flat surfaces 19 of the part 12, and finger 22 in the slot of the bolt. It will now be seen that should the part 10 attempt to move away from that which is being held by it, the same is turned to the left and this will tend to force the part 11 into close engagement with the part 12, and the part 12 in turn against the part 13, which has already been locked as previously explained.

In all the modified forms about to be described, the same principle is involved and that is, the construction of a plurality of parts so connected together that by a turning movement will force certain of the parts to jam against a firm support consisting of a nut screwed to a bolt and capable of being locked from turning movement thereon at different intervals along the bolt.

In Figure 4, I have shown a slightly modified bolt which is identical in construction with the preferred form with the exception that the part 10 is internally threaded as at 24 for co-action with the external threaded portion 25 of the part 11.

In Figure 5, I have shown a device intended to be used without contrary threads. In this form I provide the boss or extension 15 of the part 10 with threads 26 of a pitch slightly less than the pitch of the threads upon the bolt. The thread 18' of the part 11 of course being correspondingly threaded to co-operate with the threads 26.

In the form shown in Figure 6, the construction is identical to that shown in Figure 4 with the exception that the co-acting threads 24 and 25 of the parts 10 and 11 respectively are in the same direction as the threads on the bolt but the pitch of the same is slightly less. Of course in the form shown in Figures 1 to 4 inclusive the pitch is not so important, the work being done in their case by the contrary directions of the threads. In this form, however, the nut 10 cannot unscrew itself because the thread of the bolt would tend to force it away at a faster pace than the coating threads 24 and 25 would allow it.

In Figure 7 the part 10 and the part 11 have their mutual faces in the shape of helical surfaces 27 of a direction contrary to that of the thread of the bolt. The device is here represented as not yet locked, the part 12 being just ready to be pushed back against the part 13. Turning to the right will cause this part 11 to press forcibly against this part 12 as desired.

In Figure 8 it is shown that it is not even necessary that the helical surfaces be in a direction contrary to that of the thread. This surface 28, is here shown in the same direction, but of a greater pitch. Any tendency of the part 10 to move toward the part 11, when locked, will be resisted by the fact that the helical surface will not allow it to move as fast as the thread of the bolt will force it.

In Figure 9, instead of making the helical surface go completely around the part 10, I make one section of helix 20' go halfway around it, and another section of helix 30 go around the other half, the part 11 being similarly provided.

In the drawings of the Figures 7, 8 and 9, I have similarly preferred to give the helices a steep pitch at first, gradually changing to a fine one near the end of the turning.

It is clear that instead of two sections of helices being used as in Figure 9, three or more could be used, though I think one single helix as in Figures 7 and 8 will give the most effect. The sections of helices of Figure 9 may also be in the same direction as the thread of the bolt, but of smaller pitch, as is done with the helices of Figure 8. It is also clear that these helical surfaces do not absolutely need to be on cylindrical extensions of the nuts or parts, but could extend to the wrench-fitting contours themselves, and this applies equally to the planes of Figure 10.

In Figure 10, I produce the desired pressure by having the part 10 and the part 11 in contact with each other by the plane 31 which is oblique to the bolt. On both 10 and 11 this plane is rounded off, preferably, at the sharp corners, so that while the middle is of steep pitch to make the parts separate quickly at first, as the turning continues the pitch becomes less and less so as to render possible a greater pressure than could be given by straight flat planes.

In Figure 11 both parts 10 and 11 are shown threaded as at 32 and 33 respectively to the bolt 5. This could only be done with such models as are shown in Figures 5, 6 and 8, and then only if the two pitches mentioned before were different by only an extremely small quantity. It could also be done when sections of helices are used as in Figure 7, providing they are in the same direction as the thread, and also in Figure 8, providing these helical sections and inclined planes had that mentioned similarity of pitch.

In Figure 12, I show the part 10 and two washers 34 and 35 cut by oblique planes 36 and 37, the washers being also provided with wrench-fitting contours. Turning either washer, preferably the one numbered 34, will force the parts to separate as desired. These washers could be made of various shapes, could be threaded to each other, and so on, but it is clear that my principle would still be followed.

Returning to preferred form as shown in Figures 1 to 3, it may be desired to give a better friction surface to the contact between the part 11 and the part 12. For this purpose the part 11 is provided with opening 38 as shown in Figure 13 to receive the conical surface 39 of the part 12.

In the form shown in Figure 14, I have provided the part 12 with a series of teeth 41 for co-action with the teeth 42 of the part 11. It will of course be understood that the teeth are such as to prevent the part 11 from turning with relation to the part 12.

In Figures 15 and 18 inclusive, I have shown different means of preventing the part 12 from turning upon the bolt. It is clear that my device is not dependent on whether there are one, two or more grooves along the bolt nor on whether these grooves are on straight lines or whether they wind around the bolt such as the groove 43 in Figure 15.

In Figure 16 the shank 7 of the bolt is flattened as at 44 for co-action with the flat portion of the part 12. If desired the exterior periphery of the part 12 may have a single flat edge 46 instead of two, such as shown in the preferred form, for co-action with a single shoulder 20 formed with part 13.

In Figure 17, I have provided the shank 7 with a V-shaped recess 47 for the reception of a similar shaped finger 48 of the part 12. The part 12 may be provided with recesses 49 instead of the flattened surface 19 of the preferred form, for the reception of corresponding shoulders which may be formed on the part 13.

In Figure 18, I construct the part 12 with a flat upper edge 50, the sides of which taper and are rounded off as at 51 for sliding movement in a correspondingly shaped groove 52 of the shank 7.

If desired, I may also provide the member 12 with portions 53 such as shown in Figure 19 for engagement with recesses 54 in the part 13.

In Figure 20, I provide a part 12 with a flanged rim 55 adapted to fit over the wrench fitting contour of the part 13.

In Figure 21 there is shown a block 56, which takes the place of the part 12 and is received in the groove 9 of the shank 7, and co-acts with the part 13 for preventing turning movement of the same about the shank.

In Figure 22, I have shown a form somewhat similar to the preferred form but the part 13 is threaded to the part 10 as at 57, and the parts 11 and 12 are enclosed within the part 13. The part 11 is threaded directly to the bolt and has an annular recess formed in one end for the reception of the part 12. The part 12 serves the same function in this form as it does in the form shown in Figure 1, but instead of mounting the same in the part 13 it is mounted in the part 11. It will be noted that the part 13 is not threaded upon the bolt and in a tendency of the part 10 to rotate about the bolt will push against the parts 11 and 12 thereby tightening upon the same.

It is clear that in all figures the bolt could have a left-hand thread, instead of the right-hand thread which I have represented. by changing the other threads and surfaces also, and it is clear that any variation in the kind of thread used or of the outer contours of the nuts would not affect my principle either.

While I have described what I deem to be the most desirable embodiment of my invention, it is obvious that many of the details may be varied without in any way departing from the spirit of my invention, and I therefore do not limit myself to the exact details of construction, herein set forth nor to anything less than the whole of my invention limited only by the appended claims.

What is claimed as new is:—

1. A nut structure for bolts comprising relatively separable end parts having aligned threaded bores to accommodate the thread of a bolt, an intermediate part having a bore for accommodation of the bolt, means on the intermediate part, means on one of said end parts co-acting with the means of said intermediate part to permit the latter to be adjusted in the axis of the bolt and with respect to both of said end parts, means between said intermediate part and the other of said end parts slidable with relation thereto and along the axis of the bolt and adapted to co-act with the latter to be held against rotation on the bolt, and adapted to be moved by said intermediate part with respect to said other end part and to co-act therewith to hold said other end part against retrograde rotation and to permit all of the parts to be jammed together on tendency toward retrograde motion of the first mentioned end parts upon the bolt.

2. A nut structure for bolts comprising relatively separable end parts, an intermediate part, threaded bores in each of said end parts for the accommodation of the threaded shank of a bolt, co-acting surfaces on one of said end parts and said intermediate part to permit the intermediate part to be adjusted therewith, these parts adapted to be moved to the desired position upon the bolt, a washer having a finger for reception in a groove formed in the bolt, said washer adapted to be slid along the bolt and against said intermediate part, the other of said end parts adapted to be threaded on said bolt adjacent said washer, and co-acting means on said washer and said last mentioned end parts adapted to be moved into engagement with each other when the intermediate part is moved in one direction, whereby all the parts are jammed together on a tendency toward retrograde motion of the first mentioned end part upon the bolt.

3. A lock nut including a bolt having a threaded shank, a slot formed therein, a pair of end parts having a threaded bore therein for co-action with the threads on said shank, a washer for co-action with one of said end parts and with the slot in said shank to prevent rotation of said end part, and an intermediate part for co-action with the other end part whereby movement in one direction of said last named part will cause the jamming of the intermediate part against the immovable first end part.

4. A lock nut structure for bolts comprising a pair of separable end parts having threaded connection with one end of the bolt, means for locking one of said end parts against rotation on the bolt, an intermediate part co-acting with the other end part whereby movement in one direction of said last named part will cause the jamming of the intermediate part against the immovable first end part.

In testimony whereof I have affixed my signature.

HENRY E. BRIAIS.
(*Now by judicial change of name Henry E. Brice.*)